United States Patent
Yao et al.

(10) Patent No.: US 8,267,583 B2
(45) Date of Patent: Sep. 18, 2012

(54) THREE-DIMENSIONAL MACRO-CHIP INCLUDING OPTICAL INTERCONNECTS

(75) Inventors: Jin Yao, San Diego, CA (US); Xuezhe Zheng, San Diego, CA (US); Ashok V. Krishnamoorthy, San Diego, CA (US); John E. Cunningham, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 261 days.

(21) Appl. No.: 12/581,709

(22) Filed: Oct. 19, 2009

(65) Prior Publication Data

US 2011/0091157 A1 Apr. 21, 2011

(51) Int. Cl.
G02B 6/26 (2006.01)
G02B 6/34 (2006.01)
G02B 6/12 (2006.01)

(52) U.S. Cl. ............... 384/31; 385/37; 385/14
(58) Field of Classification Search .......... 385/31, 385/34, 14
See application file for complete search history.

(56) References Cited

U.S. PATENT DOCUMENTS

| | | | |
|---|---|---|---|
| 5,091,983 A * | 2/1992 | Lukosz | 385/13 |
| 6,215,585 B1 * | 4/2001 | Yoshimura et al. | 359/344 |
| 6,353,264 B1 * | 3/2002 | Coronel et al. | 257/777 |
| 6,512,618 B1 * | 1/2003 | Heflinger | 385/37 |
| 6,684,007 B2 * | 1/2004 | Yoshimura et al. | 385/31 |
| 6,693,736 B1 * | 2/2004 | Yoshimura et al. | 359/333 |
| 6,785,447 B2 * | 8/2004 | Yoshimura et al. | 385/42 |
| 6,845,184 B1 * | 1/2005 | Yoshimura et al. | 385/14 |
| 7,260,289 B1 | 8/2007 | Gunn, II | |
| 7,283,695 B2 * | 10/2007 | Gaylord et al. | 385/14 |
| 7,388,894 B2 * | 6/2008 | O'Daniel et al. | 372/50.22 |
| 7,486,853 B2 | 2/2009 | Cunningham | |
| 7,627,018 B1 * | 12/2009 | Guilfoyle et al. | 372/102 |
| 2002/0028045 A1 * | 3/2002 | Yoshimura et al. | 385/50 |
| 2002/0039464 A1 * | 4/2002 | Yoshimura et al. | 385/14 |
| 2002/0097962 A1 * | 7/2002 | Yoshimura et al. | 385/50 |
| 2003/0174940 A1 * | 9/2003 | Charlton et al. | 385/27 |
| 2003/0235370 A1 * | 12/2003 | Taillaert et al. | 385/50 |

(Continued)

OTHER PUBLICATIONS

Taillaert, Dirk et al., "An Out-of-Plane Grating Coupler for Efficient Butt-Coupling Between Compact Planar Waveguides and Single-Mode Fibers", IEEE Journal of Quantum Electronics, vol. 38, No. 7, Jul. 2002, pp. 949-955.

*Primary Examiner* — K. Cyrus Kianni
(74) *Attorney, Agent, or Firm* — Park, Vaughan, Fleming & Dowler LLP; Steven E. Stupp

(57) ABSTRACT

A multi-chip module (MCM), which includes a three-dimensional (3D) stack of chips that are coupled using optical interconnects, is described. In this MCM, disposed on a first surface of a middle chip in the 3D stack, there are: a first optical coupler, an optical waveguide, which is coupled to the first optical coupler, and a second optical coupler, which is coupled to the optical waveguide. The first optical coupler redirects an optical signal from the optical waveguide to a first direction (which is not in the plane of the first surface), or from the first direction to the optical waveguide. Moreover, the second optical coupler redirects the optical signal from the optical waveguide to a second direction (which is not in the plane of the first surface), or from the second direction to the optical waveguide. Note that an optical path associated with the second direction passes through an opening in a substrate in the middle chip.

19 Claims, 14 Drawing Sheets

U.S. PATENT DOCUMENTS

| | | | |
|---|---|---|---|
| 2004/0156610 A1* | 8/2004 | Charlton et al. | 385/129 |
| 2004/0258360 A1* | 12/2004 | Lim et al. | 385/43 |
| 2005/0254752 A1* | 11/2005 | Domash et al. | 385/37 |
| 2006/0067617 A1* | 3/2006 | Gaylord et al. | 385/37 |
| 2006/0239605 A1* | 10/2006 | Palen et al. | 385/14 |
| 2007/0058685 A1* | 3/2007 | O'Daniel et al. | 372/32 |
| 2007/0075444 A1 | 4/2007 | Zheng | |
| 2007/0086712 A1* | 4/2007 | Shani | 385/101 |
| 2010/0065726 A1* | 3/2010 | Zhong et al. | 250/227.24 |
| 2010/0119229 A1* | 5/2010 | Roelkens et al. | 398/79 |

* cited by examiner

THREE-DIMENSIONAL MACRO-CHIP INCLUDING OPTICAL INTERCONNECTS

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to a multi-chip module (MCM) that accommodates semiconductor chips. More specifically, the present disclosure relates to an MCM that includes a vertical stack of semiconductor chips with interchip optical interconnects.

2. Related Art

Engineers have recently proposed using a multi-chip module (MCM) (which is sometimes referred to as a 'macro-chip') to integrate a collection of semi-conductor chips. This MCM offers unprecedented computational density, energy efficiency, bisection bandwidth and reduced message latencies. These characteristics are obtained by photonically interconnecting multiple silicon chips into a logically contiguous piece of silicon. This interconnection technique facilitates integration of computer system components, such as: multi-core, multi-threaded processors, system-wide interconnects and dense memories.

As shown in FIG. 1, in one configuration of MCM 100, island chips 110 and bridge chips 112, are arranged in a two-dimensional, multi-tiered array. In this MCM, an upward-facing island chip (such as island chip 110-1) in the lower tier in MCM 100 is coupled to a downward-facing bridge chip (such as bridge chip 112-1) in the upper tier. In particular, in the regions where these chips overlap, communication occurs via proximity communication of optical signals (which is referred to as 'optical proximity communication' or OPxC).

Because the optical proximity communication occurs between active surfaces, island chips 110 and bridge chips 112 need to face each other. Consequently, the number of chip layers in MCM 100 is typically limited to two. However, this limitation constrains potential improvements in the device density and chip functionality that can be obtained, and thus, the performance, form factor and cost of MCM 100.

Hence, what is needed is an MCM without the above-described limitations.

SUMMARY

One embodiment of the present disclosure provides a multi-chip module (MCM) that includes a first substrate having a first surface and a second surface. This first substrate includes an opening that extends through the first substrate, where the opening is defined by an edge in the first surface, an edge in the second surface, and a side wall. Furthermore, disposed on the first surface, the first substrate includes: a first optical waveguide; a first optical coupler, which is optically coupled to the first optical waveguide; and a second optical coupler, which is optically coupled to the first optical waveguide. The first optical coupler redirects an optical signal from the first optical waveguide to a first direction, or from the first direction to the first optical waveguide, where the first direction is other than in the plane of the first surface. Moreover, the second optical coupler redirects the optical signal from the first optical waveguide to a second direction, or from the second direction to the first optical waveguide, where the second direction is other than in the plane of the first surface. Note that an optical path associated with the second direction passes through the opening.

In some embodiments, a given optical coupler, which can be either the first optical coupler or the second optical coupler, includes a grating element. This grating element may have a spatially varying index of refraction having a constant fundamental spatial wavelength or a varying fundamental spatial wavelength. Furthermore, the spatially varying index of refraction may be associated with a partially etched or a fully etched layer disposed on the first surface.

Moreover, the first optical coupler may be different than the second optical coupler. For example, the second optical coupler may include an oxide layer and/or a metal backend layer. Note that the first optical coupler and the second optical coupler may be fabricated using a common manufacturing process. This may allow the first optical coupler and the second optical coupler to be processed simultaneously, which can reduce manufacturing time and expense.

Furthermore, the first direction may be in a first half of space, and the second direction may be in a second half of space (such as upper hemisphere and a lower hemisphere, or left hemisphere and right hemisphere).

In some embodiments, the MCM includes a second substrate having a third surface, which faces the first surface. Disposed on the third surface, the second substrate may include: a second optical waveguide; and a third optical coupler, which is optically coupled to the second optical waveguide. This third optical coupler may redirect the optical signal from the first optical coupler to the second optical waveguide, or from the second optical waveguide toward the first optical coupler.

Additionally, the MCM may include a third substrate having a fourth surface, which faces the second surface. Disposed on the fourth surface, the third substrate may include: a third optical waveguide; and a fourth optical coupler, which is optically coupled to the third optical waveguide. This fourth optical coupler may redirect the optical signal from the second optical coupler to the third optical waveguide, or from the third optical waveguide toward the second optical coupler. Furthermore, the third substrate may include a layer (other than silicon) disposed on the fourth surface, and the third optical waveguide may be defined in the layer. Note that the layer may include a light source or active-material regions.

In some embodiments, there are negative features disposed on the first surface, the second surface, the third surface and the fourth surface. In addition, the MCM may include positive features that are configured to mechanically couple the first substrate and the second substrate, and/or the first substrate and the third substrate, by mating with pairs of the negative features. For example, the positive features may include micro-spheres.

Alternatively, there may be negative features disposed on at least one of the first surface and the third surface, and at least one of the second surface and the fourth surface. Furthermore, there may be positive features disposed on the other of the first surface and the third surface, and the other of the second surface and the fourth surface. These positive features may mechanically couple the first substrate and the second substrate, and/or the second substrate and the third substrate, by mating with the negative features.

Another embodiment provides a system that includes the MCM.

Another embodiment provides a first method for optically coupling an optical signal to and from the first substrate. During the first method, the optical signal is redirected from the first direction to the first optical waveguide using the first optical coupler, where the first direction is other than in the plane of the first surface of the substrate, and where the first optical waveguide and the first optical coupler are disposed on the first surface. Then, the optical signal is transported in the first optical waveguide to the second optical coupler, where the second optical coupler is disposed on the first surface. Next, the optical signal is redirected to the second direction using the second optical coupler, where the second direction is other than in the plane of the first surface. Note that the optical path associated with the second direction passes through the opening that extends through the first substrate from the first surface to the second surface of the first substrate. Furthermore, the opening is defined by the edge in the first surface, the edge in the second surface, and the side wall.

Another embodiment provides a second method for optically coupling an optical signal to and from the first substrate. During the first method, the optical signal is redirected from the second direction to the first optical waveguide using the second optical coupler. Then, the optical signal is transported in the first optical waveguide to the first optical coupler. Next, the optical signal is redirected to the first direction using the first optical coupler.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a multi-chip module (MCM), a system that includes the MCM, and a technique for coupling an optical signal using the MCM are described. This MCM includes a three-dimensional (3D) stack of chips that are coupled using optical interconnects. In particular, disposed on a first surface of a middle chip in the 3D stack there are: a first optical coupler; an optical waveguide, which is coupled to the first optical coupler; and a second optical coupler, which is coupled to the optical waveguide. The first optical coupler redirects an optical signal from the optical waveguide to a first direction (which is not in the plane of the first surface), or from the first direction to the optical waveguide. Moreover, the second optical coupler redirects the optical signal from the optical waveguide to a second direction (which is not in the plane of the first surface), or from the second direction to the optical waveguide. Note that an optical path associated with the second direction passes through an opening in a substrate in the middle chip.

Figure 1:
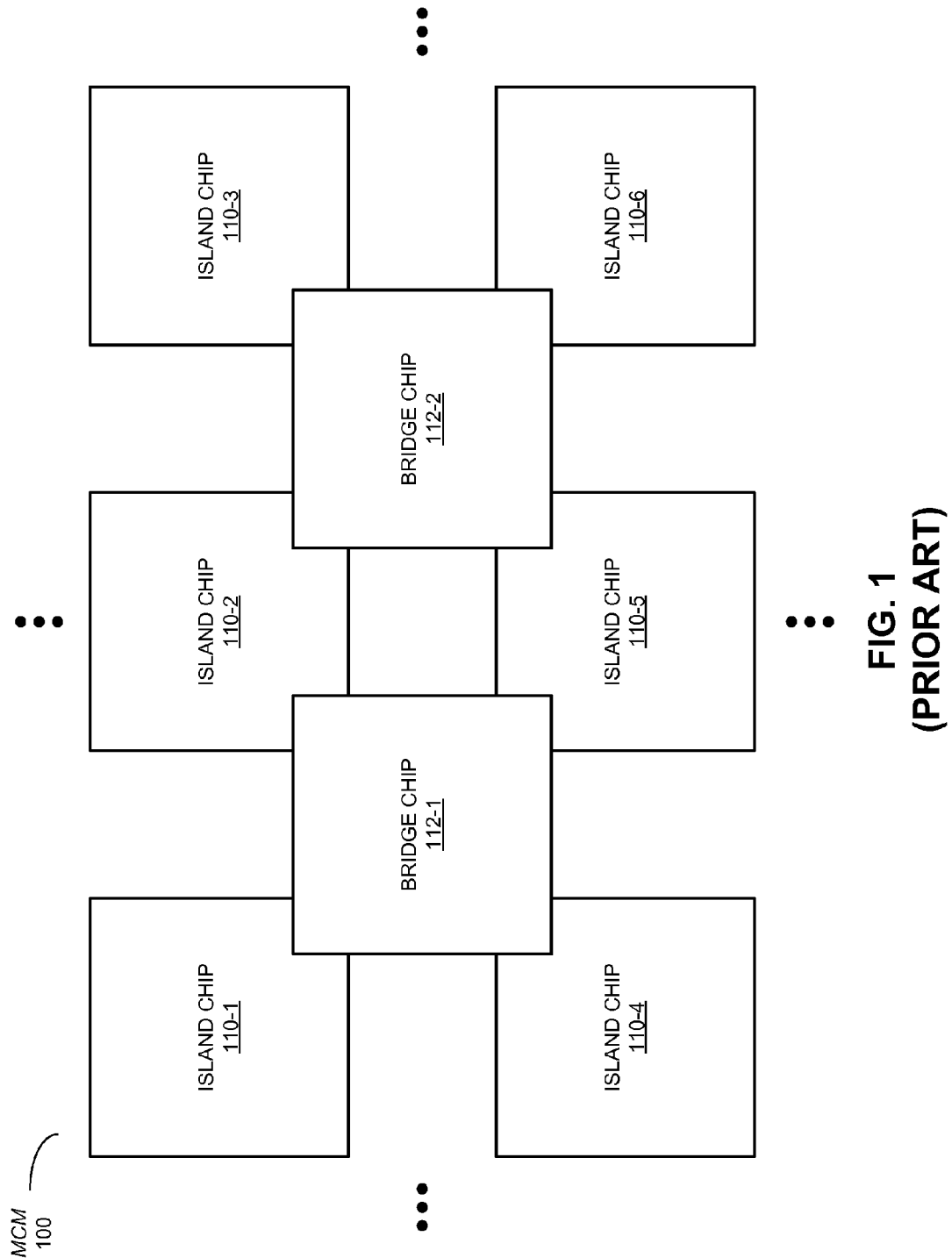
FIG. 1 is a block diagram illustrating an existing multi-chip module (MCM).

In this way, this optical coupling technique facilitates 3D chip stacking Moreover, by facilitating 3D chip stacking in the MCM, the optical coupling technique may overcome the two-chip layer constraint in MCM 100 (FIG. 1), thereby increasing the device density and the capacity-to-volume ratio. Consequently, this optical coupling technique may facilitate: smaller form factors (relative to 2D architectures); shorter communication path lengths, which improve inter- and intra-chip communication (and, thus, reduce latency and increase performance); reduced cost; and/or reduced power consumption. Furthermore, the MCM may provide a platform for hybrid integration of different functional layers (such as transmission, memory, logic, MEMS, exotic substrate material, etc.) and/or components (such as electronic integrated circuits or ICs and/or photonic ICs). These layers and components can be fabricated using different processing nodes in a manufacturing process, which may be independently optimized.

Figure 2:
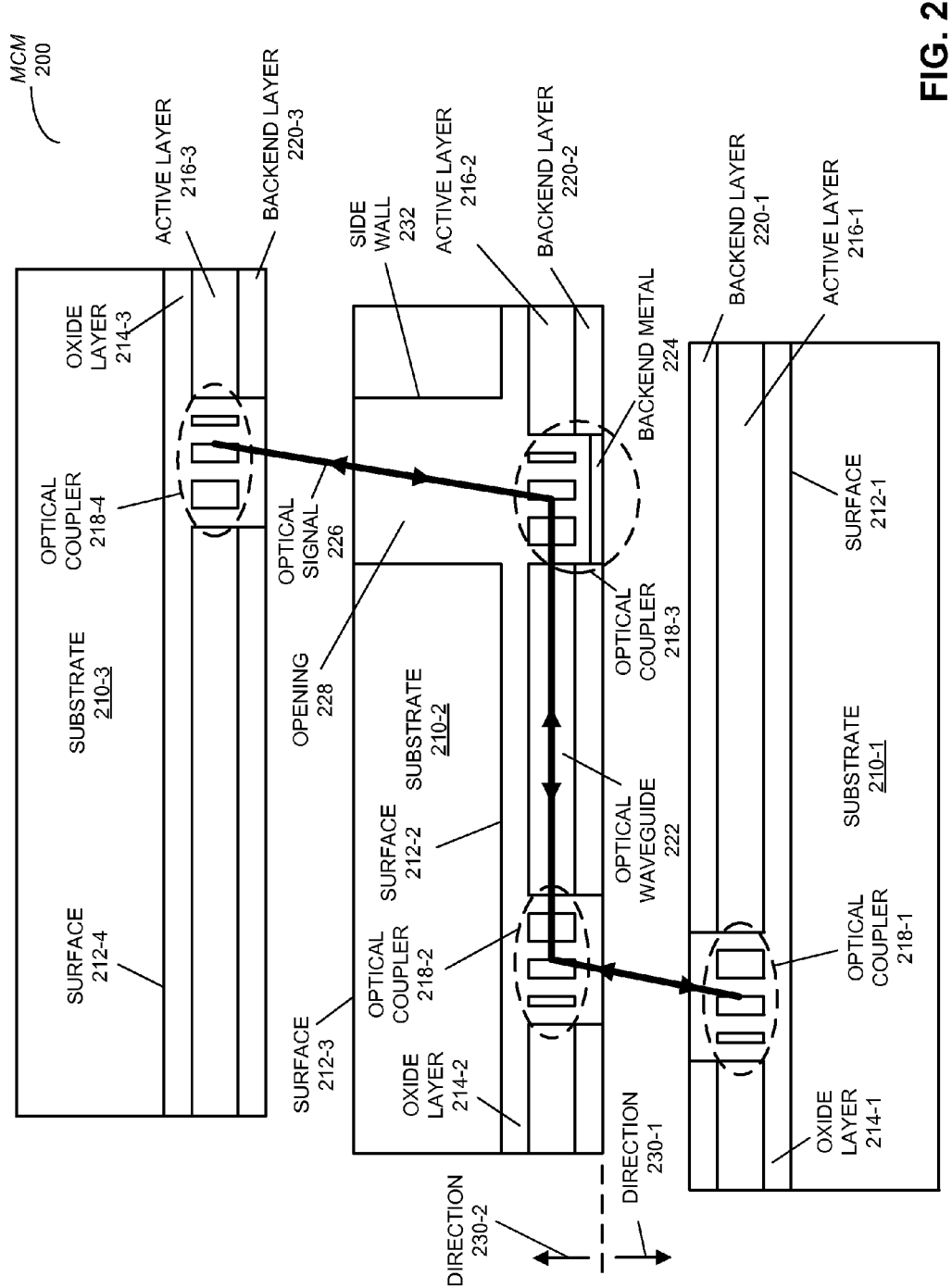
FIG. 2 is a block diagram illustrating an MCM in accordance with an embodiment of the present disclosure.

We now describe embodiments of an MCM. FIG. 2 presents a block diagram illustrating an MCM 200. This MCM includes 3D chip-stacking optical interconnects based on optical couplers 218 (such as grating elements), optical waveguide 222 and at least one through-substrate opening 228. In particular, MCM 200 includes three chips or dies, having substrates 210, which communicate one or more optical signals, such as optical signal 226, with each other using 'optical proximity communication' or OPxC.

In MCM 200, substrate 210-2 has surfaces 212-2 and 212-3, as well as opening 228, which extends through substrate 210-2 from surface 212-2 to surface 212-3. This opening is defined by an edge in surface 212-2, an edge in surface 212-3, and side wall 232. Furthermore, disposed on surface 212-2, substrate 210-2 includes: optical waveguide 222; optical coupler 218-2, which is optically coupled to optical waveguide 222; and optical coupler 218-3, which is optically coupled to optical waveguide 222. Optical coupler 218-2 redirects optical signal 226 from optical waveguide 222 to or toward a direction 230-1 (which is perpendicular to a plane of surface 212-2, and points away from substrate 210-2), or from direction 230-1 to optical waveguide 222 (i.e., in the plane of surface 212-2).

Optical signal 226 may be received or provided by optical coupler 218-1, which is disposed on surface 212-1 of substrate 210-1. Note that surface 212-1 faces surface 212-2. As with optical coupler 218-2, optical coupler 218-1 may redirect optical signal 226 from optical coupler 218-2 to an optical waveguide (not shown), which is disposed on surface 212-1. Alternatively, optical coupler 218-1 may redirect optical signal 226 from this optical waveguide toward optical coupler 218-2.

Furthermore, optical coupler 218-3 redirects optical signal 226 from optical waveguide 222 to or toward direction 230-2 (which is perpendicular to a plane of surface 212-2, and points toward substrate 210-2, i.e., which is the opposite direction to direction 230-1), or from direction 230-2 to optical waveguide 222. Note that an optical path associated with direction 230-2 passes through opening 228 (i.e., through substrate 210-2).

Optical signal 226 may be received or provided by optical coupler 218-4, which is disposed on surface 212-4 of substrate 210-3. Note that surface 212-4 faces surface 212-3. As with optical coupler 218-3, optical coupler 218-4 may redirect optical signal 226 from optical coupler 218-3 to an optical waveguide (not shown), which is disposed on surface 212-4. Alternatively, optical coupler 218-4 may redirect optical signal 226 from this optical waveguide toward optical coupler 218-3.

Chips in MCM 200 may be fabricated using a wide variety of materials and processing techniques, as is known to one skilled in the art. In some embodiments, substrates 210 are a semiconductor, such as silicon. (However, in other embodiments, other materials, such as glass or sapphire, are used.) Electrical components may be built up on these substrates using a complementary-metal-oxide-semiconductor (CMOS) process, and optical components may be built up on these substrates using a silicon-on-insulator (SOI) process. In these embodiments, optical waveguides, such as optical waveguide 222, are in active layers 216 (such as active layer 216-2), which may be SO/layers.

Furthermore, oxide layers 214 and backend layers 220 (such as a metal and/or inter-metal dielectric or IMD) may be used to define the optical components. For example, as described further below with reference to FIGS. 3A and 3B, a spatially varying index of refraction in optical couplers 218 may be provided by alternating the active layer and the oxide layer (such as silicon oxide). In addition, opening 228 may be filled with an optically transparent material (over the wavelengths associated with optical signal 226), such as an oxide, or may be filled with a gas, such as air.

Note that optical coupler 218-3 may be different from optical coupler 218-2 (and than optical couplers 218-1 and 218-4). In particular, backend layers 220 may be optically transparent (over the wavelengths associated with optical signal 226) over optical couplers 218-1, 218-2 and 218-4. However, there may be a different, optically opaque coating (over the wavelengths associated with optical signal 226) over optical coupler 218-3. For example, as shown in FIG. 2, there may be a backend metal 224 (such as aluminum or gold) over optical coupler 218-3. Alternatively or additionally, this opaque coating may be implemented using backend metal 224, oxide and/or IMD, which may reduce the cost and fabrication complexity of MCM 200. Nonetheless, in some embodiments optical couplers 218 are fabricated using a common manufacturing process, which may reduce the cost of MCM 200.

These differences in optical couplers 218-2 and 218-3 allow these components to redirect light in different directions 230. In conjunction with opening 228, this allows more than two chips to be vertically stacked in MCM 200.

Figure 3A:
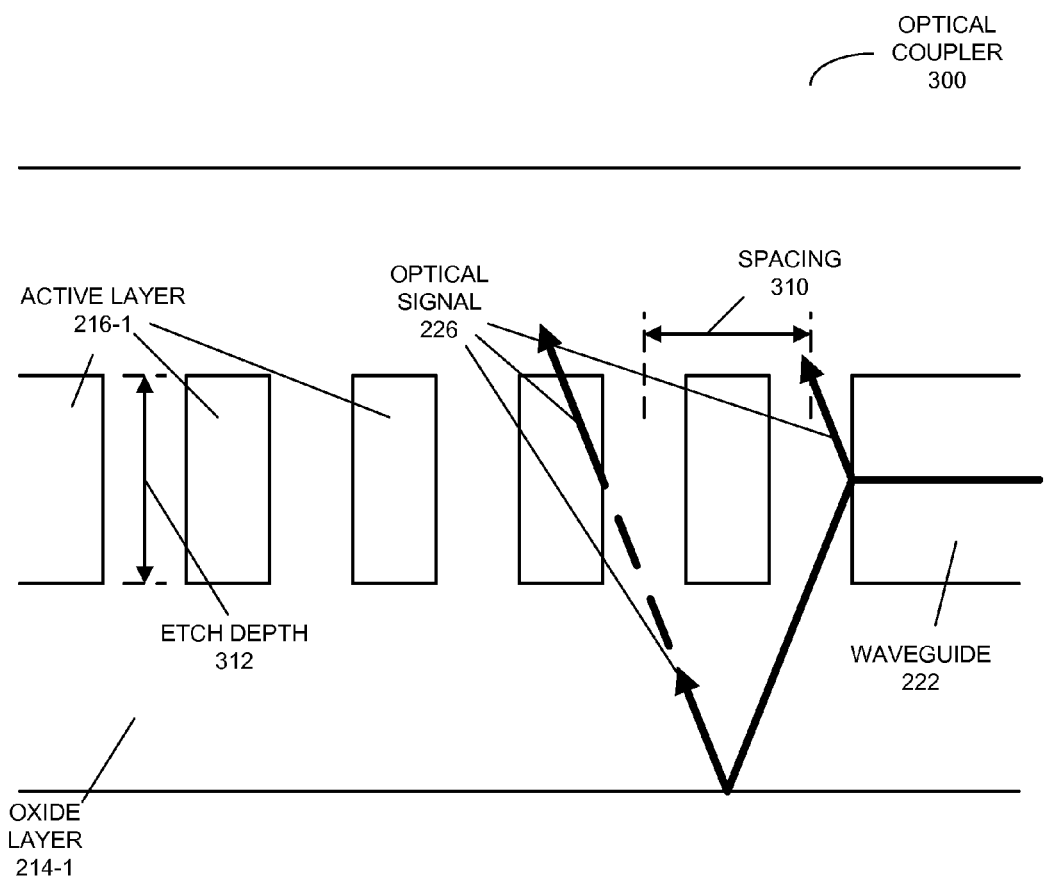
FIG. 3A is a block diagram illustrating an optical coupler for use in the MCM of FIG. 2 in accordance with an embodiment of the present disclosure.

FIG. 3A presents a block diagram illustrating an optical coupler 300 for use in MCM 200 (FIG. 2). Optical signal 226 carrying information may propagate from waveguide 222 into optical coupler 300, where an alternating pattern of higher and lower index-of-refraction materials (provided by active layer 216-1 and oxide layer 214-1) may redirect it out of the plane of a surface of a substrate on which optical coupler 300 is disposed. In particular, when light passes through optical coupler 300, the spatially varying index of refraction may scatter light towards both the top surface and the substrate (i.e., towards oxide layer 214-1 underneath the grating element). Moreover, the spatially varying index of refraction may be chosen so that the light is optically coupled away from the substrate. For example, the profile or spatial pattern of the grating element (see below) and/or a thickness of oxide layer 214-1 may be designed so that there is constructive interference between reflected light and the original beam. Alternatively, by depositing an appropriate metal layer in the backend layer, the light scattered towards the top surface can be reflected back towards the substrate.

As shown in FIG. 3A, in some embodiments an optical coupler (such as optical coupler 300) may have a periodic structure characterized by spacing 310. In particular, optical coupler 300 may have a spatially varying index of refraction having a constant fundamental spatial wavelength. However, as shown in FIG. 2, in some embodiments optical couplers 218 (FIG. 2) have a varying fundamental spatial wavelength (such as a chirp configuration).

Note that the grating element or diffraction grating in embodiments of the optical coupler may be defined using a full etch, i.e., an etch depth 312 that goes all the way through active layer 216-1. However, as shown in FIG. 3B, which presents a block diagram illustrating an optical coupler 350 for use in MCM 200 (FIG. 2), a partial etch may be used, i.e., an etch depth 360 that does not go all the way through active layer 216-1.

Figure 3B:
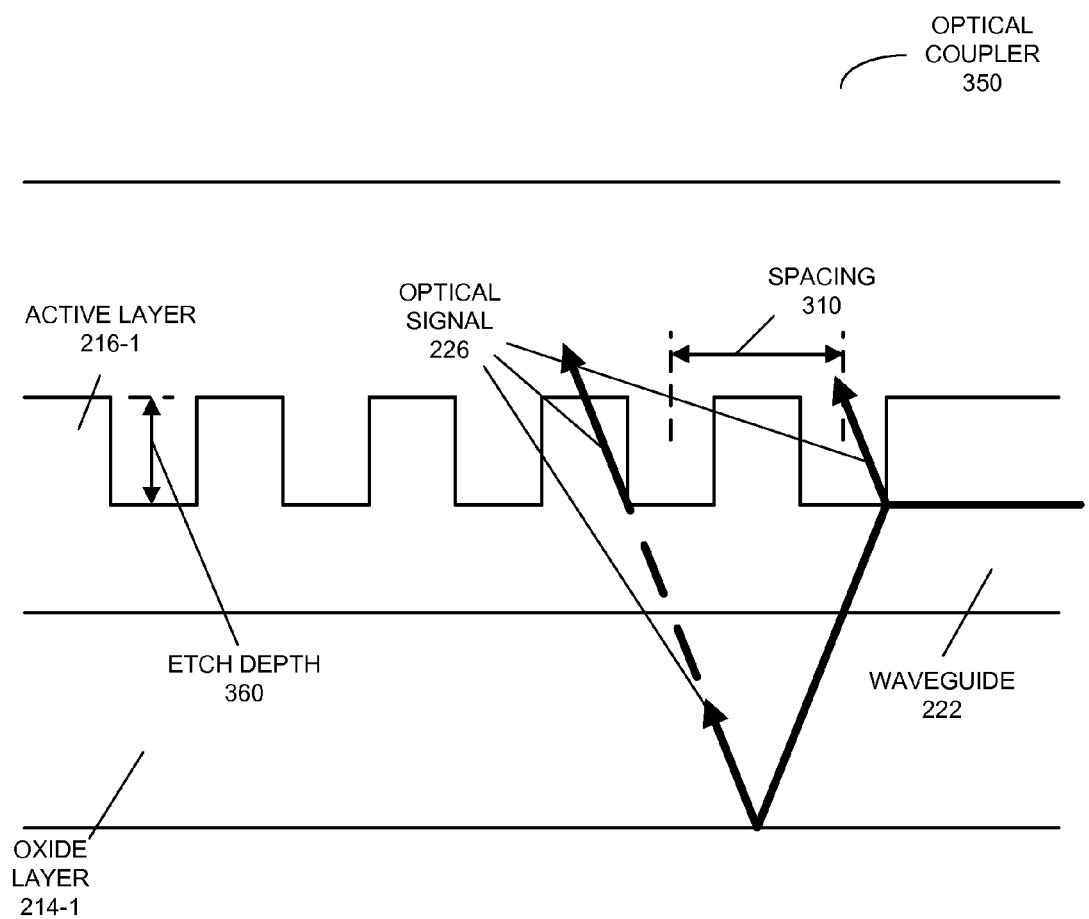
FIG. 3B is a block diagram illustrating an optical coupler for use in the MCM of FIG. 2 in accordance with an embodiment of the present disclosure.

While FIGS. 3A and 3B illustrate optical coupling of an optical signal from waveguide 222 out of the plane, in other embodiments the propagation direction is reversed. Furthermore, while FIG. 2, and FIGS. 3A and 3B illustrate passive optical couplers, in some embodiments the optical couplers are actively controlled. For example, control logic may provide signals that electronically determine whether or not a given optical coupler redirects optical signal 226 out of the plane.

Figure 4A:
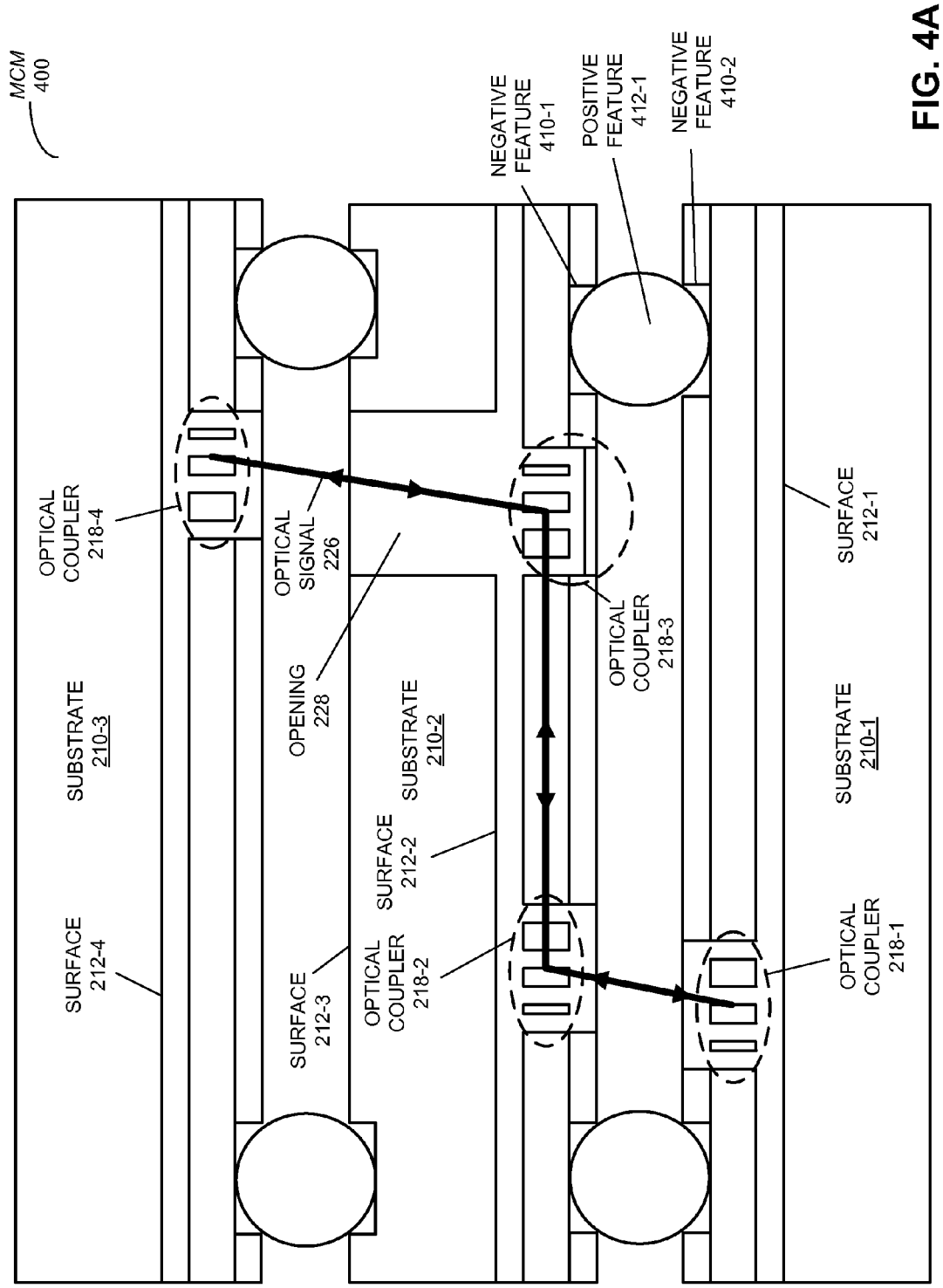
FIG. 4A is a block diagram illustrating an MCM in accordance with an embodiment of the present disclosure.

In some embodiments, the MCM includes structures that facilitate alignment of chips in a vertical stack. For example, FIG. 4A presents a block diagram illustrating an MCM 400 that includes negative features (such as negative features 410) that are defined on surfaces of the chips. These negative features may mechanically couple to positive features (such as positive feature 412-1), thereby mechanically coupling and aligning substrates 210. In particular, the positive features may be micro-spheres (such as micro-solder balls) that mechanically couple to or mate with pairs of negative features (such as negative features 410-1 and 410-2).

Figure 4B:
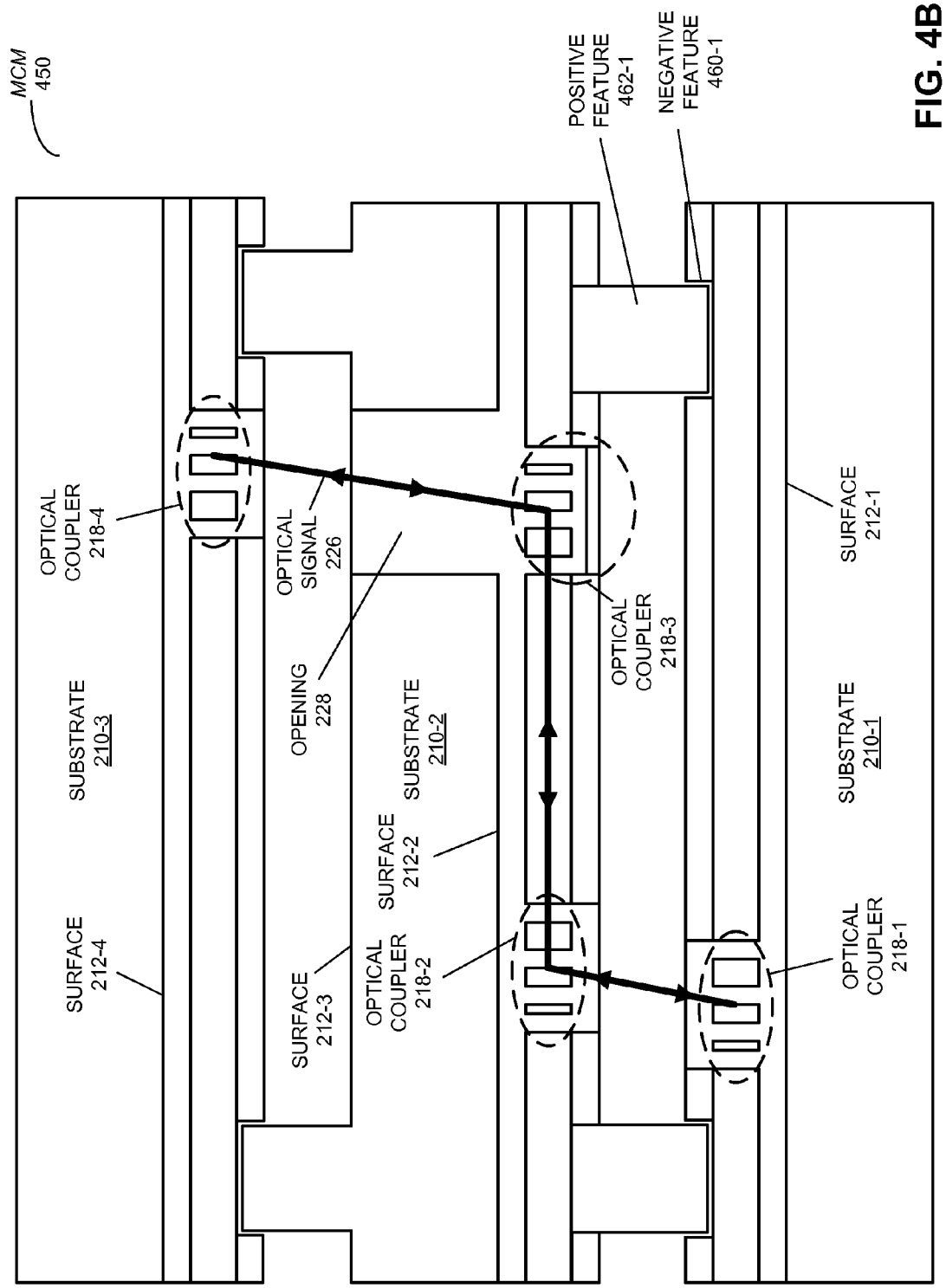
FIG. 4B is a block diagram illustrating an MCM in accordance with an embodiment of the present disclosure.

Another embodiment is shown in FIG. 4B, which presents a block diagram illustrating an MCM 450. In this MCM, negative features (such as negative feature 460-1) may be disposed on either or both of the facing surfaces in a pair of chips. Furthermore, if a negative feature (such as negative feature 460-1) is disposed on surface 212-1, there may be a corresponding positive feature (such as positive feature 462-1) which is disposed on facing surface 212-2. These positive and negative features may mechanically couple to or mate with each other, thereby mechanically coupling and aligning substrates 210.

Figure 5:
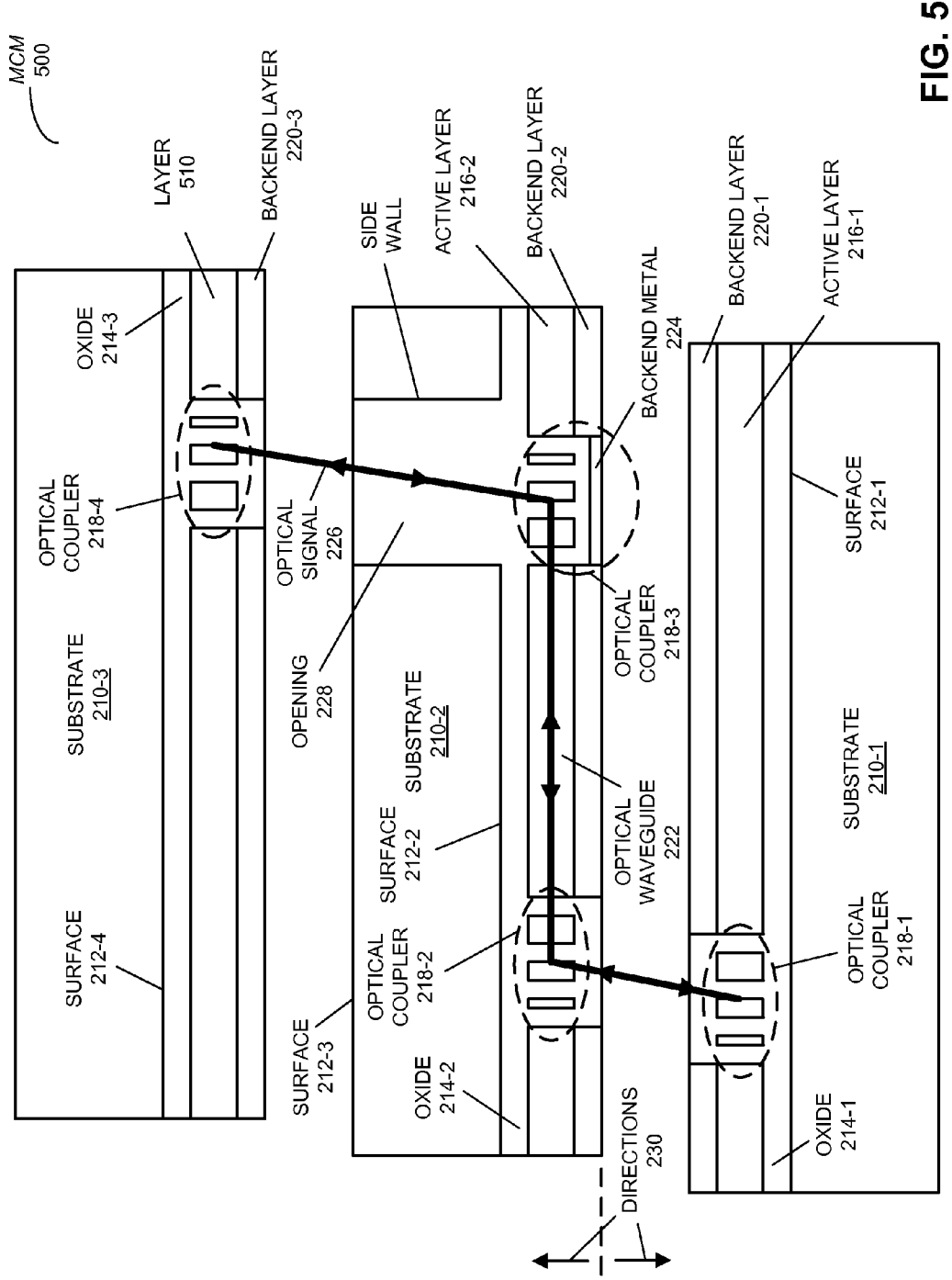
FIG. 5 is a block diagram illustrating an MCM in accordance with an embodiment of the present disclosure.

In some embodiments, at least one of the substrates 210 includes an additional material, such as: an exotic material, an epitaxial layer and/or a multiple-layer structure. Thus, in contrast with FIGS. 2, 4A and 4B, the chips in the MCM may not all include identical materials or layer structures. This is shown in FIG. 5, which presents a block diagram illustrating an MCM 500. In particular, layer 510 is disposed on surface 212-4 of substrate 210-3. This layer may include a material other than silicon or an oxide. For example, layer 510 may include: indium phosphide, gallium arsenide or an optically active material. In these embodiments, layer 510 may include a light source or light emitter, such as an on-chip laser.

Figure 6A:
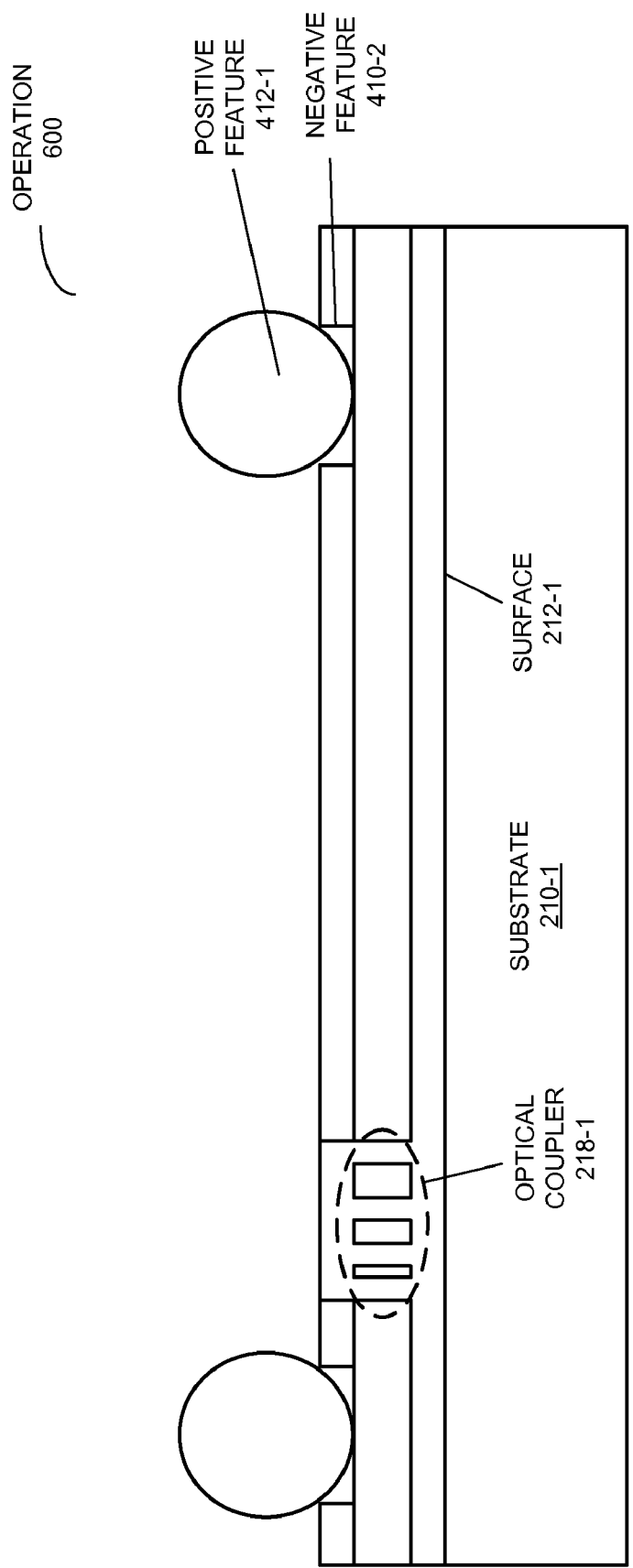
FIG. 6A is a block diagram illustrating an operation in a process for fabricating an MCM in accordance with an embodiment of the present disclosure.

We now describe embodiments of processes. FIGS. 6A-6D present operations in a process for fabricating an MCM (such as MCM 400 in FIG. 4) with 3D chip-stacking optical interconnects. In FIG. 6A, a wafer containing substrate 210-1 is fabricated in operation 600. During this operation, one or more backend layer(s) are removed and refilled with a uniform optically-transparent material, such as silicon oxide, in the vicinity of optical coupler 218-1. Furthermore, alignment components and connectors (such as positive and negative features) are fabricated or coupled to substrate 210-1.

Figure 6B:
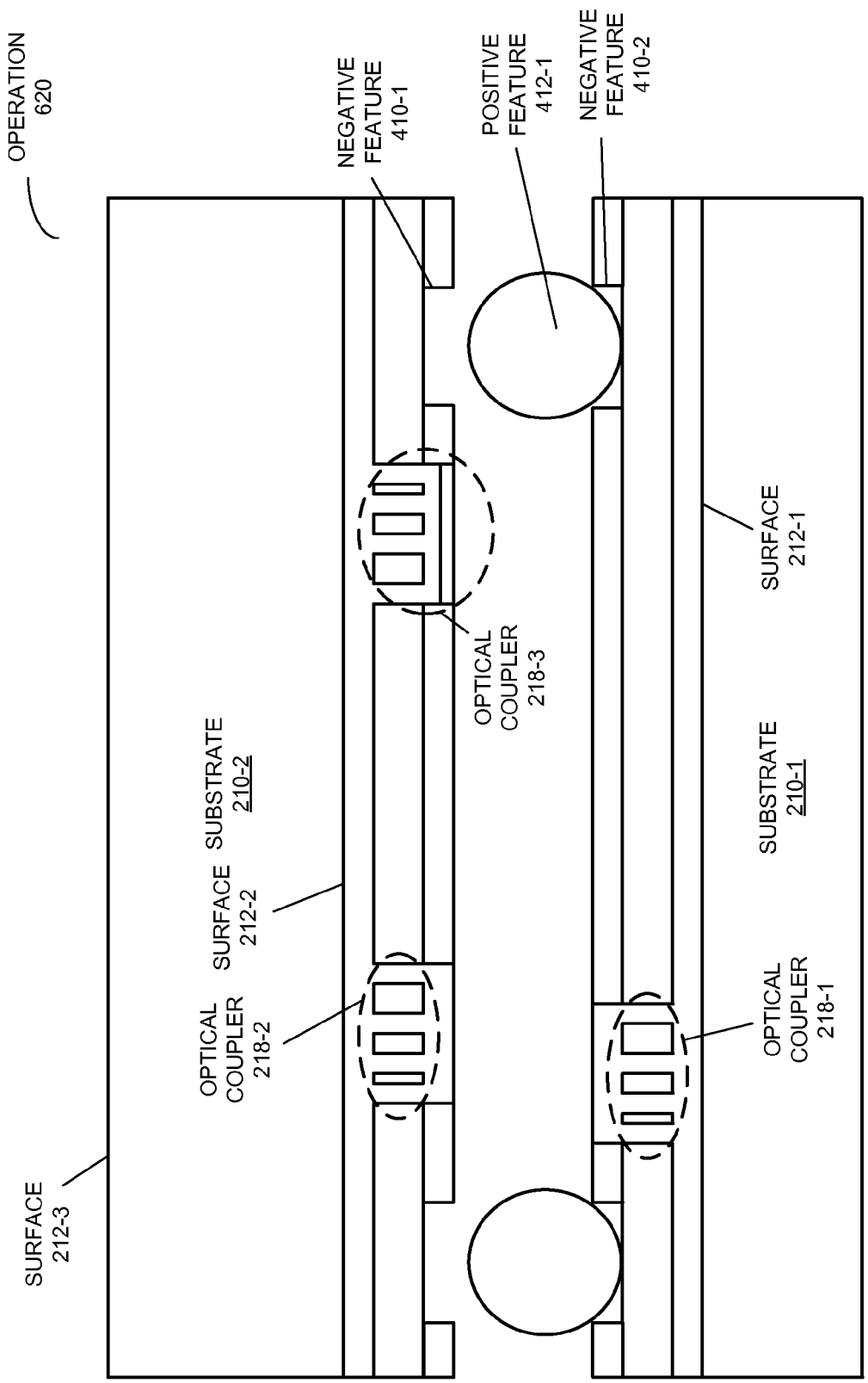
FIG. 6B is a block diagram illustrating an operation in the process of FIG. 6A in accordance with an embodiment of the present disclosure.

Then, in operation 620 in FIG. 6B, another wafer (which is fabricated in its own process) is flipped over to be mechanically coupled to and aligned with substrate 210-1. Note that wafer-level or die-level flip-chip bonding or pit-ball alignment may be used during this operation.

Figure 6C:
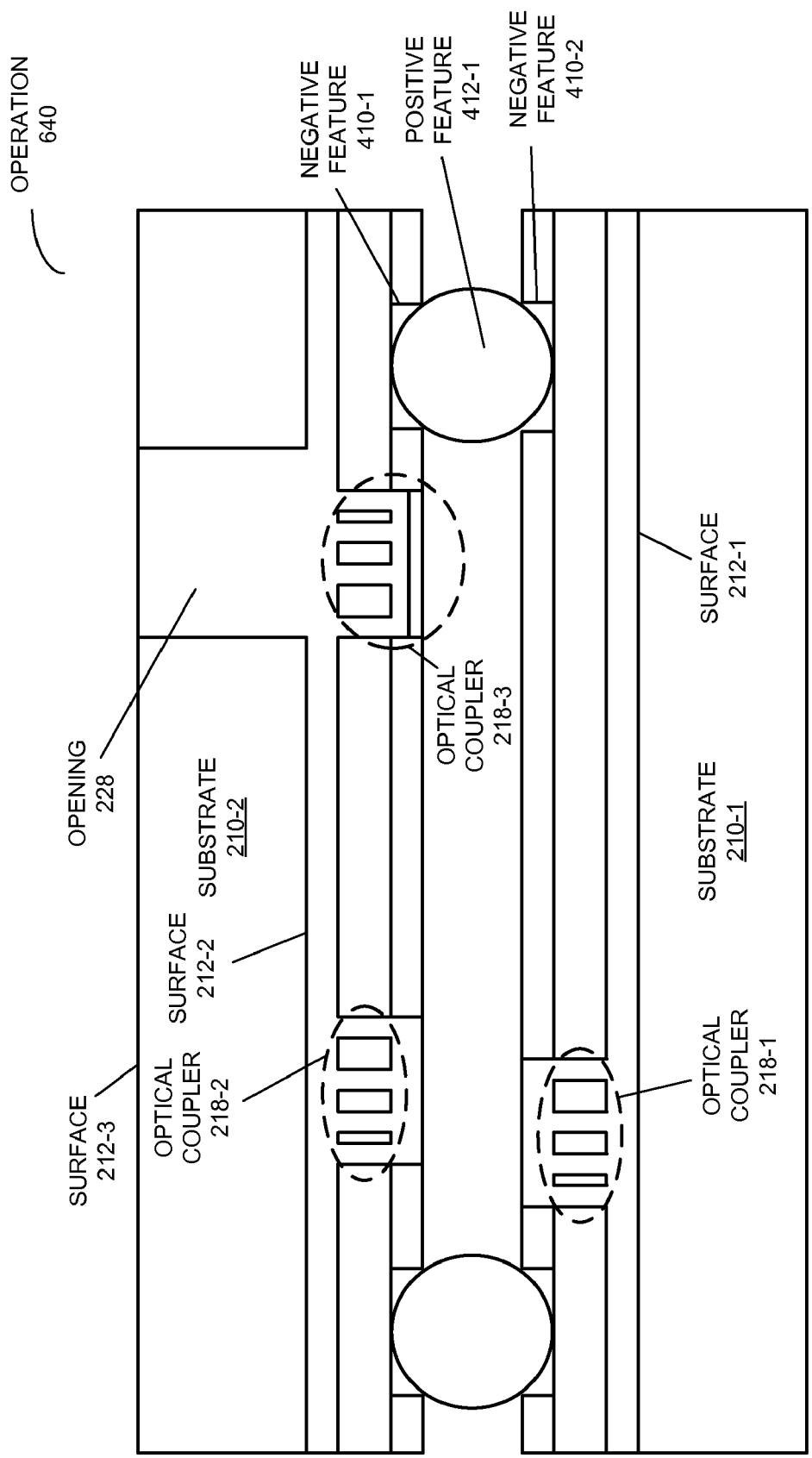
FIG. 6C is a block diagram illustrating an operation in the process of FIG. 6A in accordance with an embodiment of the present disclosure.

Moreover, in operation 640 in FIG. 6C, a portion of substrate 210-2 (or a carrier) is removed (for example, using chemical mechanical polishing) to expose surface 212-3 for the next 3D stacking chip. Furthermore, opening 228 may be etched and filled with oxide. Note that opening 228 may not require precise mechanical alignment (as long as it does not block the optical path).

Consequently, a mode shape provided by optical coupler 218-3 may not be limited to a single-mode-fiber (SMF) mode.

Figure 6D:
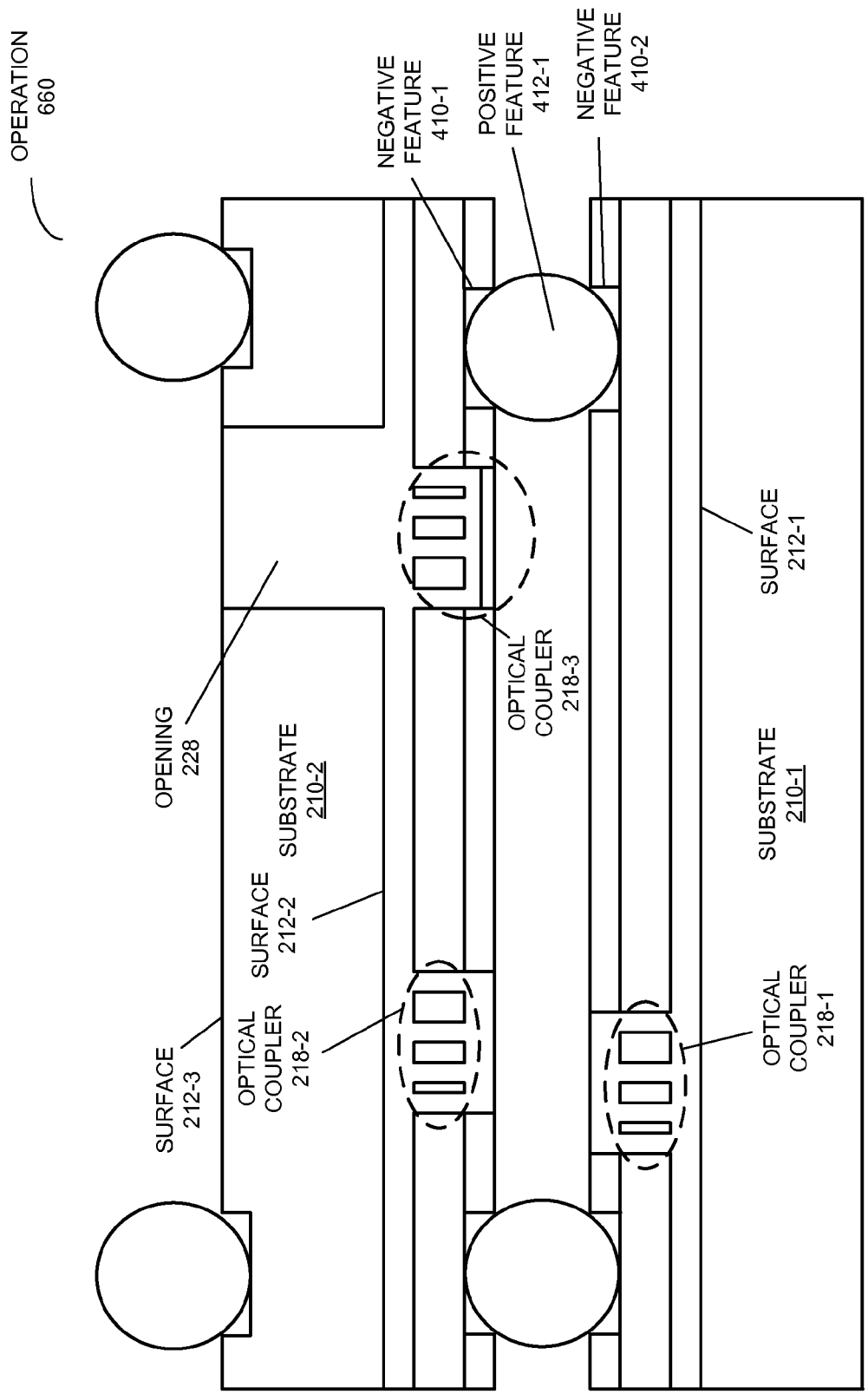
FIG. 6D is a block diagram illustrating an operation in the process of FIG. 6A in accordance with an embodiment of the present disclosure.

Next, in operation 660 in FIG. 6D, surface 212-3 of substrate 210-2 may be patterned and processed to define alignment components and optical connectors suitable for the next chip in the vertical stack. Furthermore, operations 600 (FIG. 6A), 620 (FIG. 6B), 640 (FIG. 6C) and 660 may be repeated for additional chips in the vertical stack.

Figure 7:
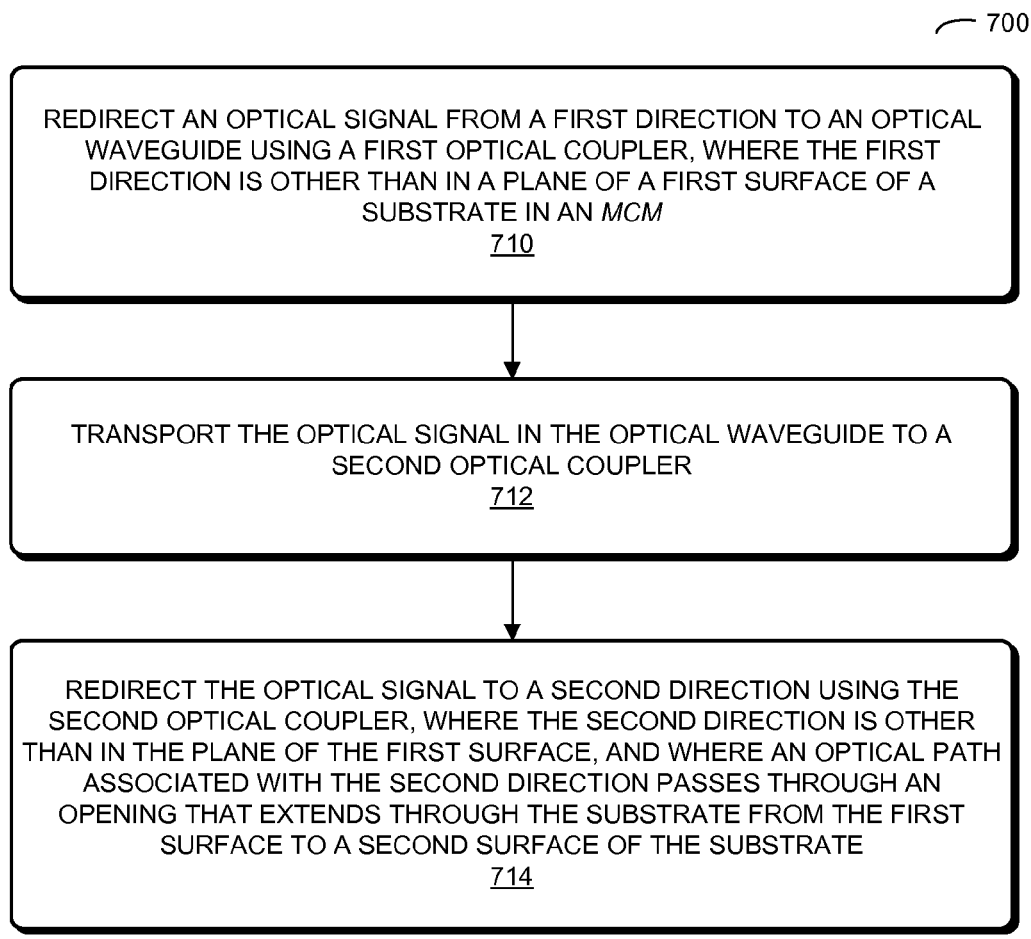
FIG. 7 is a flow chart illustrating a process for optically coupling an optical signal using an MCM in accordance with an embodiment of the present disclosure.

FIG. 7 presents a flow chart illustrating a process 700 for optically coupling an optical signal using an MCM, such as MCM 200 (FIG. 2). During this first method, the optical signal is redirected from a first direction to an optical waveguide using a first optical coupler (operation 710), where the first direction is other than in the plane of a first surface of a substrate in the MCM, and where the optical waveguide and the first optical coupler are disposed on the first surface. Then, the optical signal is transported in the optical waveguide to a second optical coupler (operation 712), where the second optical coupler is disposed on the first surface. Next, the optical signal is redirected to a second direction using the second optical coupler (operation 714), where the second direction is other than in the plane of the first surface. Note that an optical path associated with the second direction passes through an opening that extends through the substrate from the first surface to a second surface of the substrate. Furthermore, the opening is defined by an edge in the first surface, an edge in the second surface, and a side wall.

Figure 8:
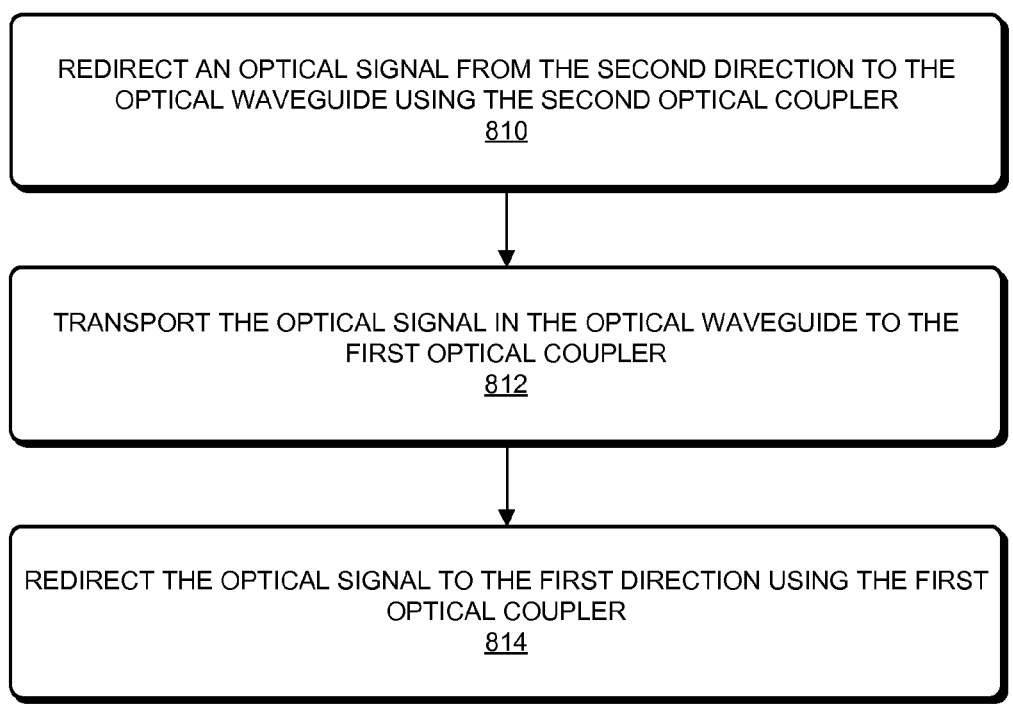
FIG. 8 is a flow chart illustrating a process for optically coupling an optical signal using an MCM in accordance with an embodiment of the present disclosure.

FIG. 8 presents a flow chart illustrating a process 800 for optically coupling an optical signal using an MCM, such as MCM 200 (FIG. 2). During this first method, the optical signal is redirected from the second direction to the first optical waveguide using the second optical coupler (operation 810). Then, the optical signal is transported in the optical waveguide to the first optical coupler (operation 812). Next, the optical signal is redirected to the first direction using the first optical coupler (operation 814).

In some embodiments of the process in FIGS. 6A-6D, as well as processes 700 (FIG. 7) and 800 (FIG. 8), there are additional or fewer operations. Moreover, the order of the operations may be changed, and/or two or more operations may be combined into a single operation.

Figure 9:
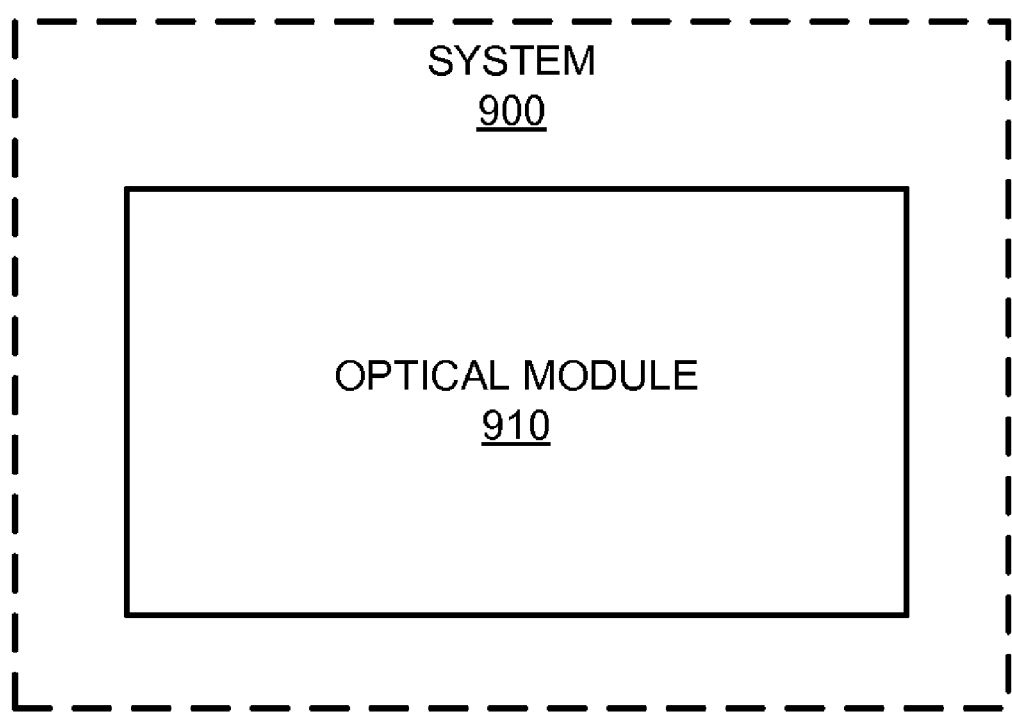
FIG. 9 is a block diagram illustrating a system in accordance with an embodiment of the present disclosure.

Embodiments of the MCM may be used in a wide variety of applications. This is shown in FIG. 9, which presents a block diagram illustrating a system 900 that includes MCM 910. In general, an MCM may include an array of chip modules (CMs) or single-chip modules (SCMs), and a given SCM may include at least one substrate, such as a semiconductor die. Furthermore, the substrate may communicate with other substrates, CMs, SCMs, and/or optical devices in the MCM using: optical proximity communication, proximity communication of capacitively coupled signals, proximity communication of inductively coupled signals, and/or proximity communication of conductively coupled signals.

Furthermore, embodiments of the MCM may be used in a variety of applications, including: VLSI circuits, communication systems (such as in wavelength division multiplexing), storage area networks, data centers, networks (such as local area networks), and/or computer systems (such as multiple processor-core computer systems). For example, an MCM may be included in a backplane that is coupled to multiple processor blades, or an MCM may couple different types of components (such as processors, memory, input/output devices, and/or peripheral devices). In some embodiments, an MCM performs the functions of: a switch, a hub, a bridge, and/or a router.

Note that system 900 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

MCM 200 (FIG. 2), MCM 400 (FIG. 4A), MCM 450 (FIG. 4B), MCM 500 (FIG. 5) and/or system 900 may include fewer components or additional components. For example, in some embodiments, instead of fabricating a through-substrate optical via (opening 228 in FIG. 2), substrate 210-2 (FIGS. 2, 4A, 4B and 5) may be removed completely, such as by using a lift-off process. Furthermore, more than one substrate 210 (FIG. 2) may include an opening (in particular, in embodiments where there are more than three chips). Alternatively or additionally, there may be additional layers between optical waveguides (such as waveguide 222 in FIG. 2) and substrates 210 (FIGS. 2, 4A, 4B and 5). Thus, a layer or component 'disposed on a surface' should be understood to include the layer or the component being directly deposited on the surface, or being deposited on one or more intermediate layers that are between the layer or the component and the surface. Note that while FIGS. 2 and 4A illustrate chips having a similar number of layers and layer thicknesses, in some embodiments, depending on the specific functions of these chips and the manufacturing processes used to fabricate them, this may not be the case.

Furthermore, although these MCMs and system 900 are illustrated as having a number of discrete items, they are intended to be functional descriptions of the various features that may be present rather than structural schematics of the embodiments described herein. Consequently, in these embodiments two or more components may be combined into a single component, and/or a position of one or more components may be changed.

In some embodiments, the active layers 216 (FIG. 2) on substrates 210 (FIGS. 2, 4A, 4B and 5) include additional components, such as: an optical source (such as a laser), a modulator, a router, a multiplexer (such as an add filter), a de-multiplexer (such as a drop filter), a detector, an amplifier, a filter, and/or a switch. For example, there may be an add filter for use in wavelength-division multiplexing. Moreover, the additional components may be associated with: a network, a bus and/or a point-to-point link. These components may be implemented using optical components and/or electrical circuits.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A multi-chip module (MCM), comprising a first substrate having a first surface and a second surface, wherein the first substrate includes an opening that extends through the first substrate, wherein the opening is defined by an edge in the first surface, an edge in the second surface, and a side wall, and wherein, disposed on the first surface, the first substrate includes:
   a first optical waveguide;
   a first optical coupler, optically coupled to the first optical waveguide, configured to redirect an optical signal from the first optical waveguide to a first direction, or from the first direction to the first optical waveguide, wherein the first direction is other than in the plane of the first surface; and
   a second optical coupler, optically coupled to the first optical waveguide, configured to redirect the optical signal from the first optical waveguide to a second direction, or from the second direction to the first optical waveguide, wherein the second direction is other than in the plane of the first surface;
   wherein an optical path associated with the second direction passes through the opening; and
   wherein a given optical coupler, which can be either the first optical coupler or the second optical coupler, comprises an element with a spatially varying index of refraction that is provided by alternating layers of material disposed on the first surface.

2. The MCM of claim 1, wherein at least one of the first optical coupler and the second optical coupler includes a grating element.

3. The MCM of claim 2, wherein the grating element includes a spatially varying index of refraction having a constant fundamental spatial wavelength.

4. The MCM of claim 2, wherein the grating element includes a spatially varying index of refraction having a varying fundamental spatial wavelength.

5. The MCM of claim 2, wherein the grating element includes a spatially varying index of refraction which is associated with a fully etched layer disposed on the first surface.

6. The MCM of claim 2, wherein the grating element includes a spatially varying index of refraction which is associated with a partially etched layer disposed on the first surface.

7. The MCM of claim 1, wherein the first optical coupler is different than the second optical coupler.

8. The MCM of claim 7, wherein the first optical coupler and the second optical coupler are fabricated using a common manufacturing process.

9. The MCM of claim 1, wherein the second optical coupler includes an oxide layer or a metal backend layer.

10. The MCM of claim 1, wherein the first direction is in a first half of space and the second direction is in a second half of space.

11. The MCM of claim 1, further comprising a second substrate having a third surface, which faces the first surface, wherein, disposed on the third surface, the second substrate includes:
    a second optical waveguide; and
    a third optical coupler, optically coupled to the second optical waveguide, configured to redirect the optical signal from the first optical coupler to the second optical waveguide, or from the second optical waveguide towards the first optical coupler.

12. The MCM of claim 11, wherein there are negative features disposed on the first surface and the third surface; and
    wherein the MCM further includes positive features that are configured to mechanically couple the first substrate and the second substrate by mating with pairs of the negative features.

13. The MCM of claim 12, wherein the positive features include micro-spheres.

14. The MCM of claim 11, wherein there are negative features disposed on one of the first surface and the third surface;
    wherein there are positive features disposed on the other of the first surface and the third surface; and
    wherein the positive features are configured to mechanically couple the first substrate and the second substrate by mating with the negative features.

15. The MCM of claim 11, further comprising a third substrate having a fourth surface, which faces the second surface, wherein, disposed on the fourth surface, the third substrate includes:
    a third optical waveguide; and
    a fourth optical coupler, optically coupled to the third optical waveguide, configured to redirect the optical signal from the second optical coupler to the third optical waveguide, or from the third optical waveguide toward the second optical coupler.

16. The MCM of claim 15, wherein the third substrate includes a layer, other than silicon, disposed on the fourth surface; and
    wherein the third optical waveguide is defined in the layer.

17. The MCM of claim 16, wherein the layer includes a light source.

18. The MCM of claim 15, wherein there are negative features disposed on the second surface and the fourth surface; and wherein the MCM further includes positive features that are configured to mechanically couple the first substrate and the third substrate by mating with the negative features.

19. A system, comprising a MCM, wherein the MCM includes a first substrate having a first surface and a second surface, wherein the first substrate includes an opening that extends through the first substrate, wherein the opening is defined by an edge in the first surface, an edge in the second surface, and a side wall, and wherein, disposed on the first surface, the first substrate includes:

a first optical waveguide;

a first optical coupler, optically coupled to the first optical waveguide, configured to redirect an optical signal from the first optical waveguide to a first direction, or from the first direction to the first optical waveguide, wherein the first direction is other than in the plane of the first surface; and a second optical coupler, optically coupled to the first optical waveguide, configured to redirect the optical signal from the first optical waveguide to a second direction, or from the second direction to the first optical waveguide, wherein the second direction is other than in the plane of the first surface;

wherein an optical path associated with the second direction passes through the opening; and wherein a given optical coupler, which can be either the first optical coupler or the second optical coupler, comprises an element with a spatially varying index of refraction that is provided by alternating layers of material disposed on the first surface.

* * * * *